United States Patent [19]

Nichting

[11] 4,033,439

[45] July 5, 1977

[54] REMOVABLE SPLINE BETWEEN CLUTCH PISTON AND CYLINDER

[75] Inventor: Robert P. Nichting, Peoria, Ill.

[73] Assignee: Caterpillar Tractor Co., Peoria, Ill.

[22] Filed: Apr. 2, 1976

[21] Appl. No.: 673,242

[52] U.S. Cl. .................. 192/85 AA; 192/70.19; 403/356; 403/318

[51] Int. Cl.² ......................... F16D 25/00

[58] Field of Search .......... 192/85 AA, 70.19; 92/165, 165 PR; 188/72.3, 72.4

[56] References Cited

UNITED STATES PATENTS

| | | | |
|---|---|---|---|
| 2,002,367 | 5/1935 | Fahrney | 192/85 AA |
| 2,759,583 | 8/1956 | Ward | 192/85 AA |
| 3,596,537 | 8/1971 | Koivunen | 192/85 AA |
| 3,765,514 | 10/1973 | Harrison | 192/85 AA |
| 3,765,519 | 10/1973 | Kell | 192/85 AA |

*Primary Examiner*—Benjamin W. Wyche
*Attorney, Agent, or Firm*—Frank L. Hart

[57] ABSTRACT

A rotating clutch of a vehicle has a plurality of clutch discs positioned between a clutch piston and a base element. A means is provided for connecting the clutch piston to the base element for rotation one with the other as a unit and movement of the clutch piston in directions toward and from the base element and intervening clutch discs.

4 Claims, 4 Drawing Figures

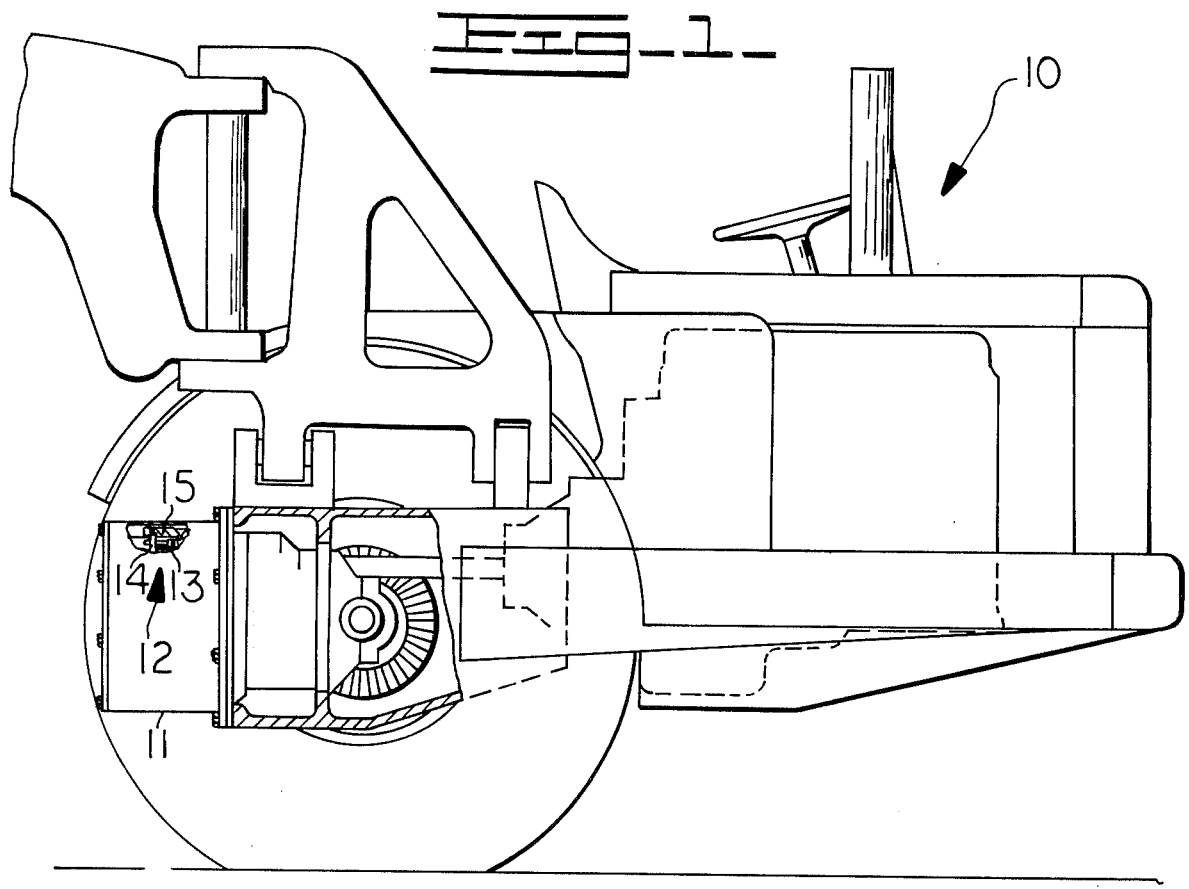
Fig_1_
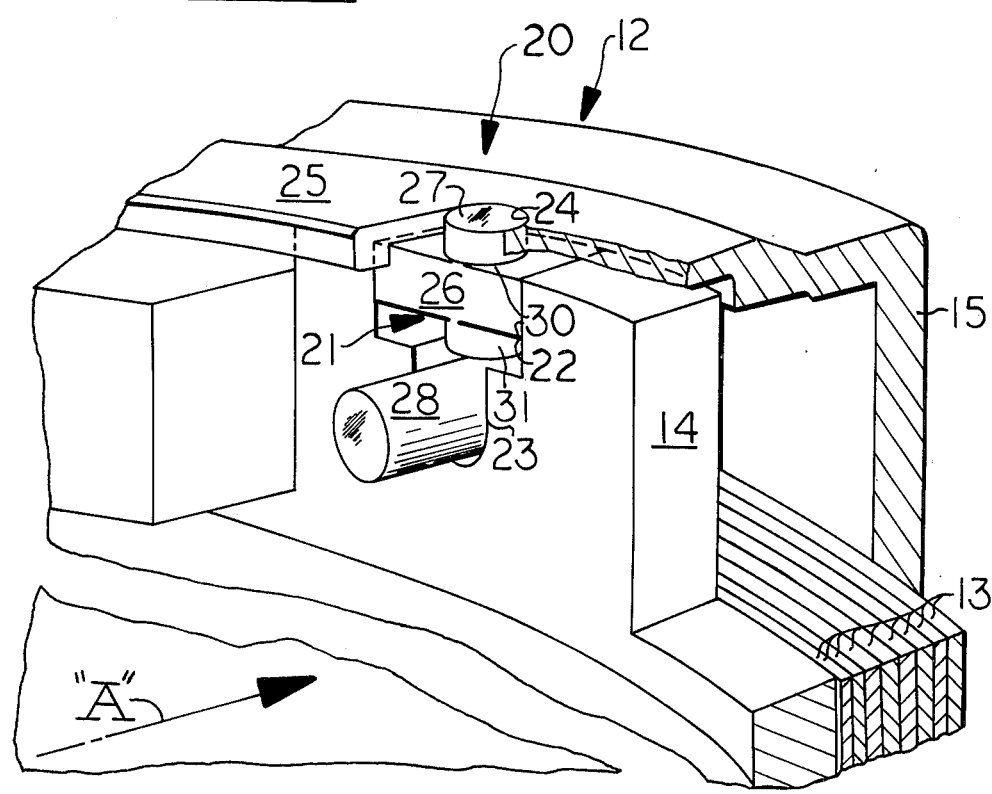
Fig_2_

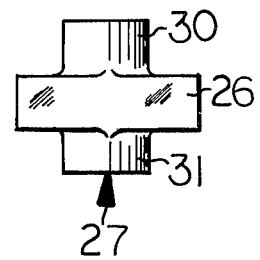
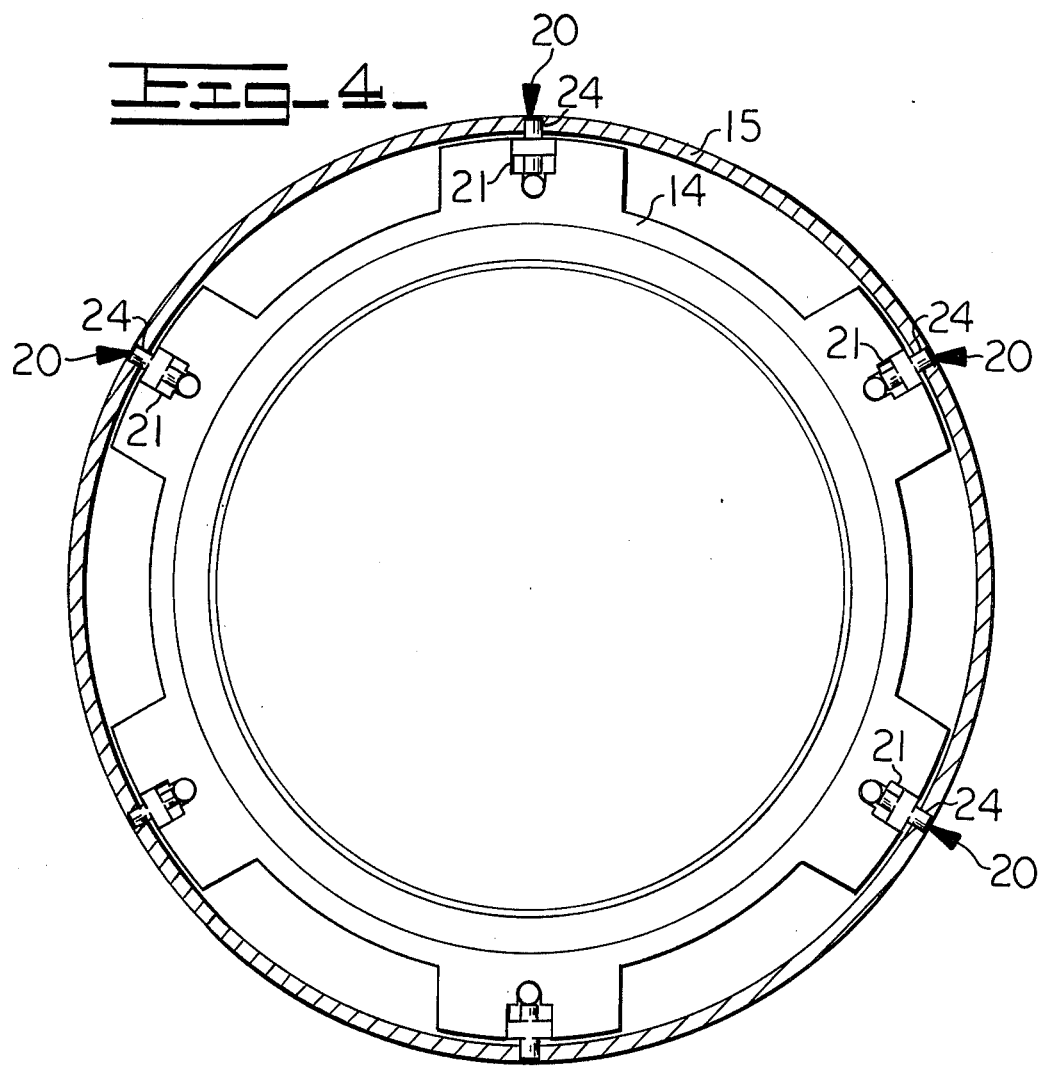

REMOVABLE SPLINE BETWEEN CLUTCH PISTON AND CYLINDER

BACKGROUND OF THE INVENTION

The rotating clutch assembly of a power shift transmission generally has a base element and a clutch piston separated by intervening clutch discs with the base element and clutch piston being free to rotate independently relative one to the other. The intervening discs are therefore subjected to an undesirable amount of wear which represents a waste of labor, time and material.

This invention resides in means for connecting the clutch piston to the base element for rotation together as a unit while permitting axial movement of the clutch piston in directions toward and from the base element and intervening clutch discs.

BRIEF DESCRIPTION OF THE DRAWINGS

FIG. 1 is a diagrammatic side view of a portion of a work vehicle having the apparatus of this invention;

FIG. 2 is an isometric view of the apparatus of this invention;

FIG. 3 is a diagrammatic side view in section of another embodiment of the block and locking pin of this invention; and FIG. 4 is a diagrammatic view of another embodiment of the apparatus.

DETAILED DESCRIPTION OF THE INVENTION

Referring to FIG. 1, a vehicle 10, such as an earthmoving vehicle, has a power shift transmission 11 which has a rotating clutch 12. The rotating clutch 12 has a plurality of clutch discs 13 positioned between a clutch piston 14 and a base element 15, as is well known in the art.

Referring to FIG. 2, means 20 is provided for connecting the clutch piston 14 to the base element 15 for rotation one with the other as a unit and a movement of the clutch piston 14 in directions toward and from the base element 15 and intervening clutch discs 13.

The clutch piston 14 has an axis "A" at least one slot 21 on the outer periphery. The slot 21 has first and second portions 22, 23 of different configuration. The second portion 23 is positioned between the first portion 22 of the slot 21 and the axis A. The slot 21 of the clutch piston 14 is aligned at a location adjacent an opening 24 through the base element 15.

As can be seen on the drawing, the slot 21 extends through the clutch piston 14 in a direction generally parallel with the axis A and the opening 24 extends through a channel portion 25 of the base element 15 in a direction generally normal to the axis A.

A guiding block 26 is positioned within the first portion 22 of the clutch piston slot 21 and the clutch piston 14 is slidably movable along the axis A and relative to the guiding block 26 in the installed position.

A locking pin 27 extends from the guiding block 26 into and through opening 24 of the base element 15, in the installed position. A retaining pin 28 is positioned in the second portion 23 of the clutch piston slot 21 for removably maintaining the locking pin 27 in the base element opening 24.

The locking pin 27 and guiding block 26 can be separate elements, as shown in FIG. 2, or can be a unitary element, as shown in the embodiment of FIG. 3. The locking pin 27, guiding block 26, and slot 21 can be of other configuration without departing from this invention.

In the preferred embodiments shown, a first pin portion 30 extends from one side of the block and into the opening 24 and a second pin portion 31 extends from an opposed side of the block in a direction toward the second portion 23 of the slot 21.

As shown in FIG. 2, the channel portion 25 of the base element 15 extends over an outer edge portion of the clutch piston 14 and is of a size sufficient for limiting movement of the clutch piston along the axis A to a preselected distance. The radial depth of the first portion 22 of the clutch piston slot 21, which is of a generally rectangular configuration, is of a size sufficient for inserting the guiding block 26 in the slot 21 and, thereafter, the locking pin 27 in the base element opening 24 in the installed position of the clutch piston 14 in the channel 25 of the base element 15. The retaining pin 28 is of a size sufficient for positioning said pin 28 in the second portion of the slot 21 and maintaining the locking pin 27 in the balancing pin opening 24.

Referring to FIG. 4, although only a single means 20 has been described for controllably locking the clutch piston 14 to the base element 15, the rotating clutch can have a plurality of means 20 positioned in associated slots 21 arcuately spaced about the outer periphery of the clutch piston 14 and associated openings 24 of the base element 15.

In the operation of the apparatus of this invention, the guiding block 26 with its associated locking pin 27 extending through the base element opening 24 causes the clutch piston 14 and base element 15 to rotate as a unit. However, the clutch piston 14 is movable along the axis A relative to the base element 15 by movement of the clutch piston 14 along the guiding block 26 within the slot 21.

Owing to the relative sizes of the elements, the guiding block 26 and associated locking pin 27 can be dropped into the slot 21 and then moved toward the base element 15 for inserting the locking pin 27 into the opening 24. The retaining pin 28 is then inserted in the second portion 23 of the slot 21 for maintaining the guiding block 26 positioned adjacent the base element 15 and the locking pin 27 in the opening 24.

By the construction of this apparatus, considerable forces can be subjected on the assembly without damage to the connecting means 20. The connecting means also functions to reduce wear of the clutch discs 13.

Other aspects, objects, and advantages of this invention can be obtained from a study of the drawings, the disclosure, and the appended claims.

What is claimed is:

1. In a rotating clutch a vehicle having positioned between a movable clutch piston and a base element, the improvement comprising:
   said clutch piston having an axis and at least one slot on the outer periphery, said slot having first said second portions adjacent an opening through the base element; and
   means for connecting the clutch piston to the base element for rotating one with the other as a unit and movement of the clutch piston in directions toward and from the base element and intervening clutch disc, said means comprising:
   a guiding block positioned within the first portion of the clutch piston slot, said clutch piston being slidably movable along the axis and relative to the block;

a locking pin extending from the guiding block through the opening of the base element; and a retaining pin positioned in the second portion of the clutch piston slot, said retaining pin being of size sufficient for removably maintaining the locking pin in the base element opening.

2. Apparatus, as set forth in claim 1, wherein the guiding block and locking pin are separate elements.

3. Apparatus, as set forth in claim 1, wherein the base element has a channel extending over an outer edge portion of the clutch piston and being of a size sufficient for limiting axial movement of the clutch piston to a preselected value, the radial depth of the first portion of the clutch piston slot is of a size sufficient for inserting the guiding block and associated locking pin in the slot in the installed position of the clutch piston in the channel, and the retaining pin is of a size sufficient for maintaining the locking pin in the base element opening.

4. Apparatus, as set forth in claim 1, including a plurality of said means positioned in spaced apart associated slots and openings of the base element.

* * * * *

UNITED STATES PATENT AND TRADEMARK OFFICE
CERTIFICATE OF CORRECTION

PATENT NO. : 4,033,439
DATED : July 5, 1977
INVENTOR(S) : Robert P. Nichting

It is certified that error appears in the above—identified patent and that said Letters Patent are hereby corrected as shown below:

Column 2, line 55, after "having", insert -- at least one clutch disc --.
Column 3, line 6, after "of", insert --a--.

Signed and Sealed this

Seventh Day of February 1978

[SEAL]

Attest:

RUTH C. MASON
Attesting Officer

LUTRELLE F. PARKER
Acting Commissioner of Patents and Trademarks